US010771439B2

(12) United States Patent
Jowett et al.

(10) Patent No.: US 10,771,439 B2
(45) Date of Patent: Sep. 8, 2020

(54) SHIELDED NETWORKS FOR VIRTUAL MACHINES

(71) Applicant: Microsoft Technology Licensing, LLC, Redmond, WA (US)

(72) Inventors: Alan Thomas Gavin Jowett, Monroe, WA (US); Ravi T. Rao, Redmond, WA (US); Gregory M. Cusanza, Redmond, WA (US); Nir Ben-Zvi, Bellevue, WA (US); Dean A. Wells, Snohomish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 243 days.

(21) Appl. No.: 15/635,199

(22) Filed: Jun. 28, 2017

(65) Prior Publication Data
US 2019/0007378 A1    Jan. 3, 2019

(51) Int. Cl.
*H04L 29/06* (2006.01)
*G06F 21/60* (2013.01)
(Continued)

(52) U.S. Cl.
CPC ...... *H04L 63/0428* (2013.01); *G06F 9/45558* (2013.01); *G06F 21/445* (2013.01);
(Continued)

(58) Field of Classification Search
CPC . H04L 63/0428; H04L 63/164; H04L 9/3268; G06F 21/606; G06F 21/445;
(Continued)

(56) References Cited

U.S. PATENT DOCUMENTS

| 7,003,118 B1 * | 2/2006 | Yang ............... H04L 63/0485 |
| | | 370/393 |
| 7,627,748 B2 | 12/2009 | Saito et al. |

(Continued)

FOREIGN PATENT DOCUMENTS

| CA | 2139744 A1 | 1/1994 |
| WO | 2009051471 A2 | 4/2009 |
| WO | 2016205044 A1 | 12/2016 |

OTHER PUBLICATIONS

"International Search Report and Written Opinion Issued in PCT Application No. PCT/US18/033992", dated Nov. 21, 2018, 12 Pages.

(Continued)

*Primary Examiner* — Aravind K Moorthy (57) ABSTRACT

Embodiments relate to a host encrypting network communications of virtual machines (VMs) in ways that minimize exposure of the network communications in cleartext form. The host captures and registers a measure of a secure state of the host. The measure is registered with a guardian service communicable via a network. The guardian service also securely stores keys of the VMs. Each VM's key is associated with authorization information indicating which machines are authorized to obtain the corresponding VM's key. The host obtains access to a VM's key based on a confirmation that its state matches the registered measured state and based on the authorization information of the VM indicating that the host is authorized to access the key. The VM's key is then used to transparently encrypt/decrypt network communications of the VM as they pass through a virtualization layer on the host that executes the VMs.

20 Claims, 10 Drawing Sheets

(51) Int. Cl.
*G06F 21/44* (2013.01)
*G06F 9/455* (2018.01)
*H04L 9/32* (2006.01)

(52) U.S. Cl.
CPC .......... *G06F 21/606* (2013.01); *H04L 9/3268* (2013.01); *H04L 63/164* (2013.01); *G06F 2009/45587* (2013.01); *G06F 2009/45595* (2013.01)

(58) Field of Classification Search
CPC ....... G06F 9/45558; G06F 2009/45595; G06F 2009/45587
USPC .......................................................... 726/26
See application file for complete search history.

(56) References Cited

U.S. PATENT DOCUMENTS

| | | | |
|---|---|---|---|
| 8,494,485 B1* | 7/2013 | Broch | H04L 9/3263 455/410 |
| 8,527,769 B2* | 9/2013 | Kotla | H04L 9/0861 713/171 |
| 8,788,814 B2 | 7/2014 | Witchey | |
| 8,966,581 B1 | 2/2015 | Gross et al. | |
| 9,143,480 B2 | 9/2015 | Brousseau et al. | |
| 9,367,341 B2 | 6/2016 | Laor et al. | |
| 9,652,631 B2* | 5/2017 | Novak | G06F 21/6209 |
| 10,152,600 B2* | 12/2018 | Rozas | G06F 9/45558 |
| 10,250,588 B1* | 4/2019 | Tarafdar | H04L 63/0823 |
| 10,423,791 B2* | 9/2019 | Wells | G06F 21/575 |
| 2004/0210772 A1* | 10/2004 | Hooker | H04L 63/123 726/2 |
| 2005/0102503 A1* | 5/2005 | Imai | G06F 21/445 713/156 |
| 2005/0229004 A1* | 10/2005 | Callaghan | H04L 9/3268 713/185 |
| 2006/0185011 A1* | 8/2006 | Cromer | H04L 63/145 726/13 |
| 2007/0226786 A1* | 9/2007 | Berger | G06F 21/57 726/9 |
| 2008/0046581 A1* | 2/2008 | Molina | H04W 12/06 709/229 |
| 2009/0083432 A1* | 3/2009 | Saito | H04L 47/10 709/231 |
| 2009/0154708 A1* | 6/2009 | Kolar Sunder | H04L 9/083 380/279 |
| 2009/0235341 A1* | 9/2009 | Hashimoto | G06F 21/608 726/5 |
| 2010/0235619 A1* | 9/2010 | Inoue | H04L 63/0428 713/151 |
| 2011/0202983 A1* | 8/2011 | Pope | G06F 21/572 726/7 |
| 2011/0296409 A1* | 12/2011 | Lo | G06F 8/71 718/1 |
| 2011/0302415 A1* | 12/2011 | Ahmad | G06F 21/57 713/168 |
| 2011/0321152 A1* | 12/2011 | Tor | H04L 63/164 726/12 |
| 2012/0117381 A1* | 5/2012 | Lo | G06F 21/575 713/156 |
| 2012/0324239 A1* | 12/2012 | Falk | G06F 21/121 713/189 |
| 2014/0075185 A1* | 3/2014 | Dragomir | H04L 9/3268 713/156 |
| 2014/0137115 A1 | 5/2014 | Tosa et al. | |
| 2014/0208111 A1 | 7/2014 | Brandwine et al. | |
| 2014/0226820 A1* | 8/2014 | Chopra | H04L 63/0485 380/277 |
| 2014/0298066 A1* | 10/2014 | Zhang | H04L 12/12 713/323 |
| 2015/0052610 A1* | 2/2015 | Thom | H04L 63/145 726/24 |
| 2015/0071298 A1* | 3/2015 | Combs | H04L 45/44 370/409 |
| 2015/0082304 A1* | 3/2015 | Hepkin | G06F 21/53 718/1 |
| 2015/0186668 A1* | 7/2015 | Whaley | G06F 16/178 713/156 |
| 2015/0237050 A1* | 8/2015 | Lee | H04L 63/101 713/155 |
| 2015/0271208 A1* | 9/2015 | Gallant | H04L 9/3247 726/1 |
| 2015/0318986 A1* | 11/2015 | Novak | H04L 63/0428 713/189 |
| 2016/0140343 A1* | 5/2016 | Novak | G06F 21/575 713/2 |
| 2016/0142215 A1* | 5/2016 | Kruegel | H04L 9/006 713/158 |
| 2016/0149912 A1* | 5/2016 | Scott-Nash | H04L 63/0876 713/176 |
| 2016/0306966 A1* | 10/2016 | Srivastava | H04L 63/08 |
| 2016/0330301 A1* | 11/2016 | Raindel | H04L 67/327 |
| 2016/0342429 A1* | 11/2016 | Johansson | H04L 63/0876 |
| 2016/0359622 A1 | 12/2016 | Bunch et al. | |
| 2016/0378522 A1* | 12/2016 | Kaplan | G06F 12/1408 718/1 |
| 2016/0378529 A1* | 12/2016 | Wen | G06F 21/00 718/1 |
| 2017/0005990 A1* | 1/2017 | Birger | H04L 63/045 |
| 2017/0061127 A1* | 3/2017 | Ionescu | G06F 21/575 |
| 2017/0109175 A1* | 4/2017 | Angaluri, Sr. | G06F 9/4416 |
| 2017/0192801 A1* | 7/2017 | Barlev | G06F 9/4555 |
| 2017/0295024 A1* | 10/2017 | Lin | H04L 63/20 |
| 2017/0302459 A1* | 10/2017 | Fenner | H04L 9/0819 |
| 2017/0329937 A1* | 11/2017 | Choi | H04L 9/088 |
| 2017/0338951 A1* | 11/2017 | Fu | H04L 9/0852 |
| 2018/0004954 A1* | 1/2018 | Liguori | H04L 9/3263 |
| 2018/0063103 A1* | 3/2018 | Jahid | H04L 63/0807 |
| 2018/0091312 A1* | 3/2018 | Thom | H04L 9/3247 |
| 2018/0107608 A1* | 4/2018 | Kaplan | G06F 3/0622 |
| 2018/0181764 A1* | 6/2018 | Huntley | G06F 21/602 |
| 2018/0189087 A1* | 7/2018 | Palermo | G06F 9/45558 |
| 2018/0211034 A1* | 7/2018 | Costa | G06F 9/45558 |
| 2018/0212932 A1* | 7/2018 | Novak | H04L 9/0822 |
| 2018/0212940 A1* | 7/2018 | Novak | H04L 63/0428 |
| 2018/0314827 A1* | 11/2018 | Wells | G06F 9/4401 |
| 2018/0324176 A1* | 11/2018 | Campagna | H04L 63/061 |
| 2019/0052627 A1* | 2/2019 | Ferreira | H04L 63/0421 |
| 2019/0138729 A1* | 5/2019 | Blundell | G06F 11/16 |

OTHER PUBLICATIONS

Apolinario, Vinicius, "What are Shielded VMs in Windows Server 2016 Hyper-V?", https://blogs.technet.microsoft.com/datacentersecurity/2016/03/14/windows-server-2016-shielded-vms-protecting-tenant-secrets/, Published on: Mar. 14, 2016, 2 pages.

* cited by examiner

SHIELDED NETWORKS FOR VIRTUAL MACHINES

BACKGROUND

Machine virtualization has become a common way to present the physical resources of a computer as virtual machines (VMs) within which guest operating systems may execute. Typically, a virtualization layer manages sharing of a computer's hardware resources among VMs executing on the computer. The virtualization layer might be a hypervisor, a virtualization module in an on-the-metal kernel, or other privileged software that manages execution of VMs.

One advantage of machine virtualization is that different entities or tenants can share the resources of a same computer. In addition, a virtualization host (a computer hosting VMs) can be managed by one entity (e.g., a host administrator) and the VMs on the host, including their guest software, can be managed by entities other than the host administrator. That is to say, machine virtualization can be commoditized by one entity (e.g., a virtualization or cloud vendor) and consumed by other entities (VM tenants).

This ability of physical machines to be shared among different entities offers advantages and disadvantages. One advantage is that utilization levels of computer hardware can be maximized. This economic efficiency benefits vendors and tenants. Another advantage is that tenants can avoid the cost of managing hardware and virtualization software. The vendor administers the hardware and virtualization environment and the tenants administer their individual VMs and/or guest software thereon. The different roles of vendors and tenants is also a disadvantage. A vendor usually has administrators with privileged administrative accounts on the virtualization hosts that execute the tenant VMs. A vendor with such kernel-level privileges can access static and dynamic data of tenant VMs. For example, a vendor/host administrator might be able to mount and read a tenant VM's virtual disks. When a tenant VM is executing, an administrator might be able to access the hardware through which the VM's data flows; privileged access may allow a host administrator to access a VM's memory space, for instance. Even if a VM's memory or virtual disk is somehow secured or shielded from host administrator access, a VM's network communications may be vulnerable. A host administrator might easily tap into a VM's network communications as they pass through the VM's host machine.

Although there are techniques for securing network communications, the known techniques have drawbacks only appreciated by the instant inventors. It is possible for guest software in a VM to encrypt its network communications. Known protocols such as Secure Hypertext Transport Protocol (HTTPs), Internet Protocol Security (IPSec), and the like have been used to provide end-to-end per-flow or per session encryption. However, such encryption at the transport, network, and/or application layers has shortcomings. Encryption is performed on a per-application or per-connection basis and encrypting all of a VM's network communications may be difficult or impossible. Encryption at the physical/media layer has also been used, but communication payloads are exposed before they enter (and after they exit) the encrypted media segment. Furthermore, over time, current encryption measures may become obsolete, vulnerabilities may arise, new applications might need to be manually configured for encryption, etc. Avoiding security lapses may require regular administration by tenants.

The inventors have appreciated that there is a need to secure a VM's network communications in ways that are transparent to the VM and that avoid exposing cleartext (or weakly encrypted) VM communications to host administrators, in particular where a VM's communications flow through the VM's host between the VM and the host's physical network interface card (NIC).

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to a host encrypting network communications of virtual machines (VMs) in ways that minimize exposure of the network communications in cleartext form. The host captures and registers a measure of a secure state of the host. The measure is registered with a guardian service communicable via a network. The guardian service also securely stores keys of the network (all VMs connected to a same network may share the same key). Each VM's key is associated with authorization information indicating which machines are authorized to obtain the corresponding VM's key. The host obtains access to a VM's key based on a confirmation that its state matches the registered measured state and based on the authorization information of the VM indicating that the host is authorized to access the key. The VM's key is then used to transparently encrypt/decrypt network communications of the VM as they pass through a virtualization layer on the host that executes the VMs.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
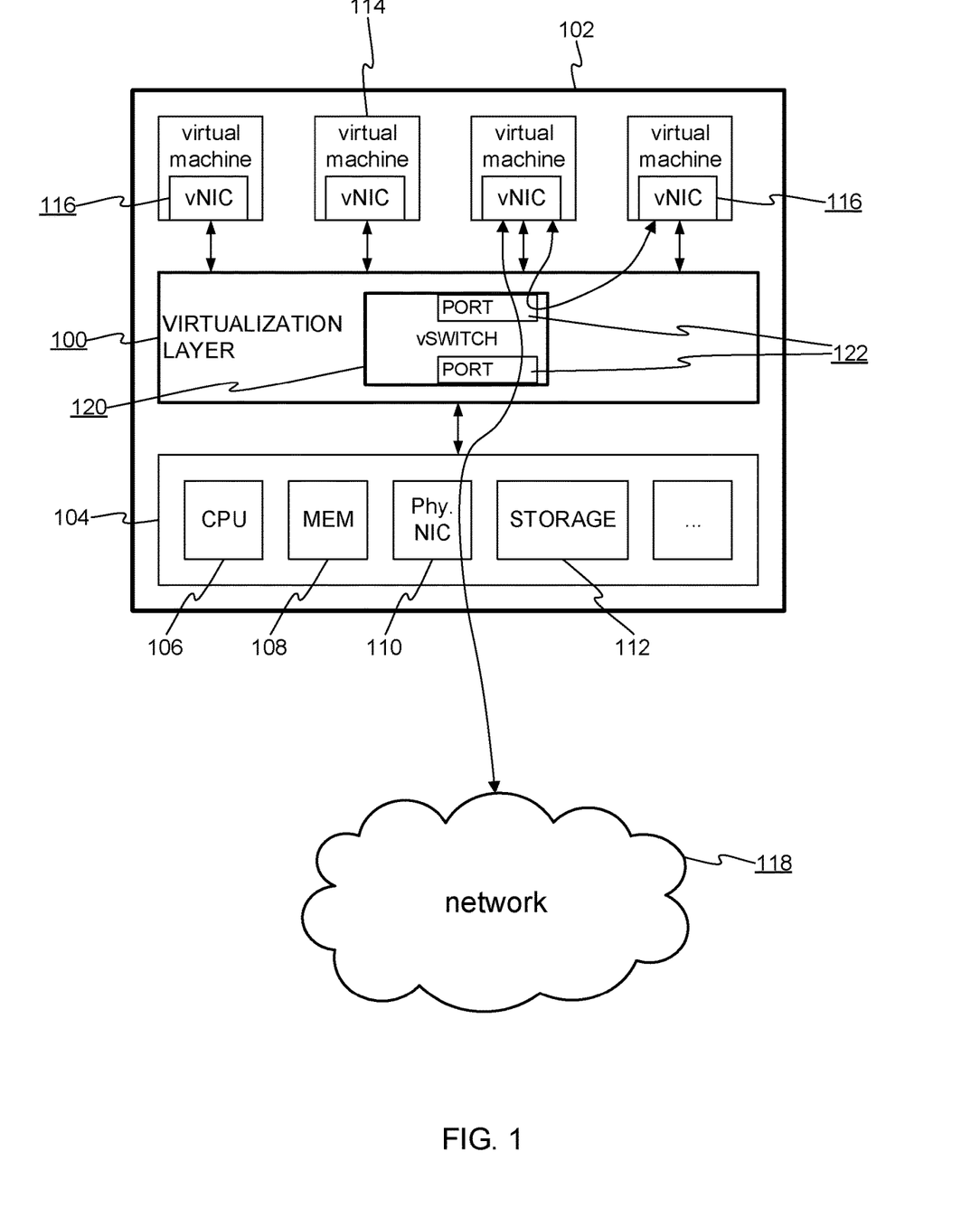
FIG. 1 shows an example virtualization environment.

FIG. 1 shows an example virtualization environment that includes a virtualization layer 100. The virtualization layer 100 may comprise a hypervisor, virtualization modules in a host kernel, or other known machine virtualization architectures. A host computer 102 has hardware 104, including a central processing unit (CPU) 106, memory 108, a physical network interface card (pNIC) 110, non-volatile storage 112, and other components not shown, such as a bus, a display and/or display adapter, etc. The virtualization layer 100 manages and facilitates execution of virtual machines (VMs) 114. Each virtual machine 114 typically has virtualized devices including a virtual NIC (vNIC) 116, a virtual disk within which a guest/host operating system is stored, etc.

In some embodiments, machine or system virtualization is provided by a hypervisor kernel of the virtualization layer 100 cooperating with a host operating system that executes in a privileged VM. In such embodiments, the tasks of virtualization may be distributed among the hypervisor and the host (privileged) operating system in a number of ways. In some cases, the host operating system might consist only of minimal virtualization elements such as tools and user interfaces for managing the hypervisor. In other cases, the host operating system might include one or more of: device virtualization management, inter-VM communication facilities, running device drivers, starting or stopping other VMs, tools for interactive VM management, and others. In any case, as used herein, "virtualization layer" refers to any type I or type II hypervisor, and the embodiments described herein may be implemented for any type I or type II virtualization hypervisor.

The virtualization layer 100 includes facilities to provide networking to the VMs 114. The virtualization layer 100 will usually have its own network stack (see FIGS. 8 and 9) to enable it to communicate through a network 118. This network stack may be used by the virtualization layer 100 for its own virtualization-related network communications. The virtualization layer's network stack is also used to handle network communication of the VMs 114. Many virtualization layers include a virtual switch (vSwitch) 120. The vSwitch 120 enables VMs to connect to virtual networks and the physical network 118. In one embodiment, the vSwitch 120 is a virtual (software-based) layer-2 Ethernet switch with virtual ports 122 usable by vNICs an pNICs. In other embodiments, the vSwitch 120 may implement a combination of layer-2 switching and layer-3 routing. In addition to functioning as a network switch, the vSwitch may provide other networking functions which are described elsewhere (e.g., network address translation). In one embodiment discussed below, the vSwitch 120 is extensible; filters or modules can be stacked within the vSwitch 120. If the virtualization layer supports direct ownership of hardware by VMs (e.g., using single root I/O virtualization (SR IOV), then the vNIC may be directly connected to a pNIC, bypassing the vSwitch. The network encryption techniques described below are applicable to all ways VMs can be provided with network connectivity.

Figure 2:
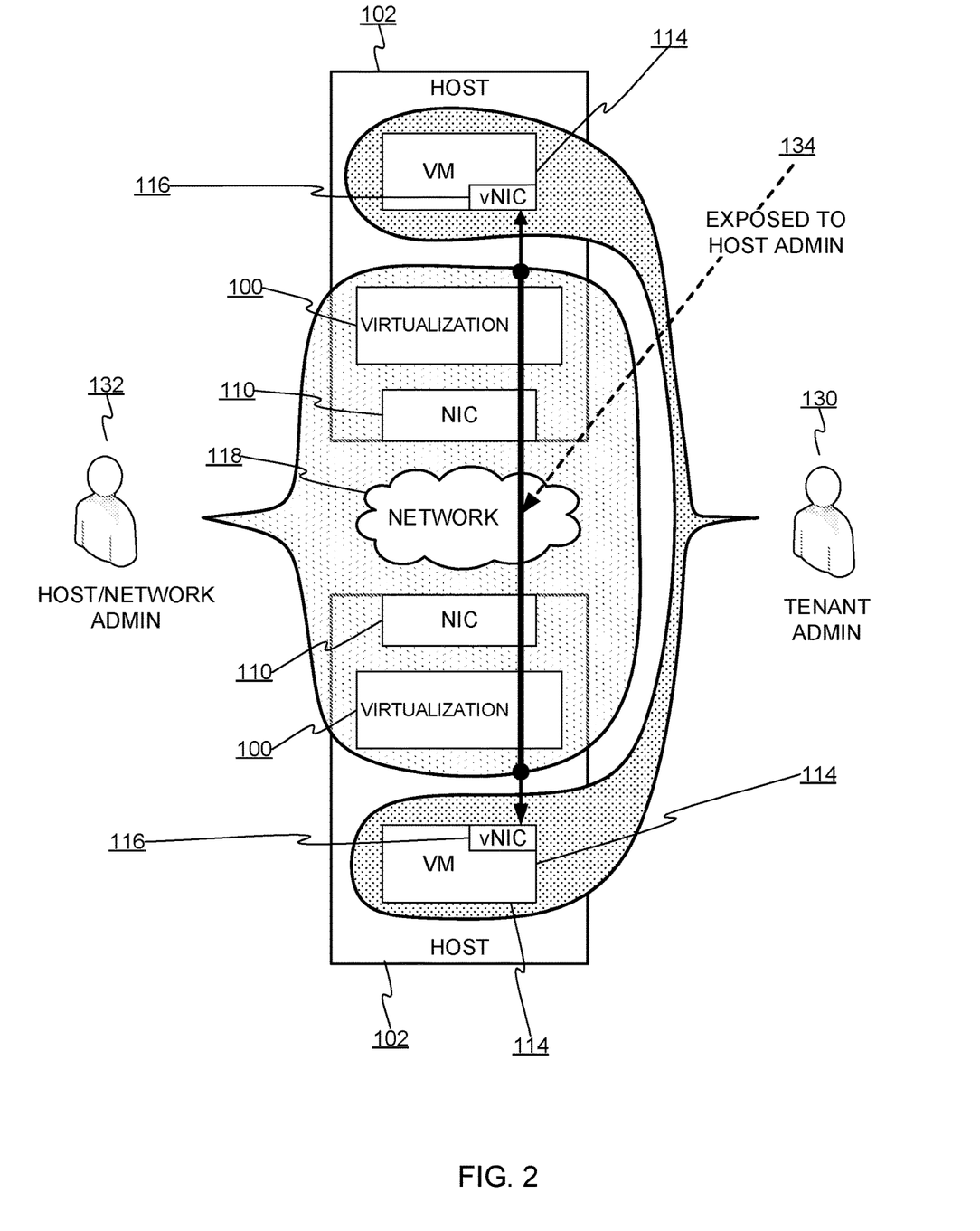
FIG. 2 shows how VM network communications of a tenant are exposed to a host administrator.

FIG. 2 shows how VM network communications of a tenant 130 are exposed to a host administrator 132. The VMs 114 shown in FIG. 2 are owned and managed by the tenant 130. Unlike the host administrator 132, the tenant 130 does not have administrative privileges for the host computer 102. Even if it is assumed that the memory and/or virtual disks of the VMs 114 are somehow shielded from the host administrator 132, as communications 134 (e.g. IP flows) pass through the virtualization layer 100, the host administrator's privileges permit him or her to access the VM's communications. For instance, a software-based network tap or shim, a memory reader, a logger/tracer logging all vNIC/pNIC communications, VM logging/tracing, etc., can be used to access the VM's network transmissions. Depending on the implementation of the virtualization layer, even vNIC 114 data may be vulnerable. If a VM's guest software is encrypting its flows, then there may be little or no exposure to the host admin 132 for those flows. However, as mentioned above, relying on the VM's guest software to secure itself has disadvantages.

To summarize, because VMs' network communications flow through host software (e.g., the virtualization layer 100), and because the host software is vulnerable to administrative privilege on the host, the VMs' network flows are vulnerable to interception by software with host administrator 132 privileges. Furthermore, even if the host administrator 132 does not attempt to access VM network communications on a respectively administered host, any cleartext communications from a VM will nonetheless be vulnerable when they pass beyond the host's physical NIC 110.

Figure 3:
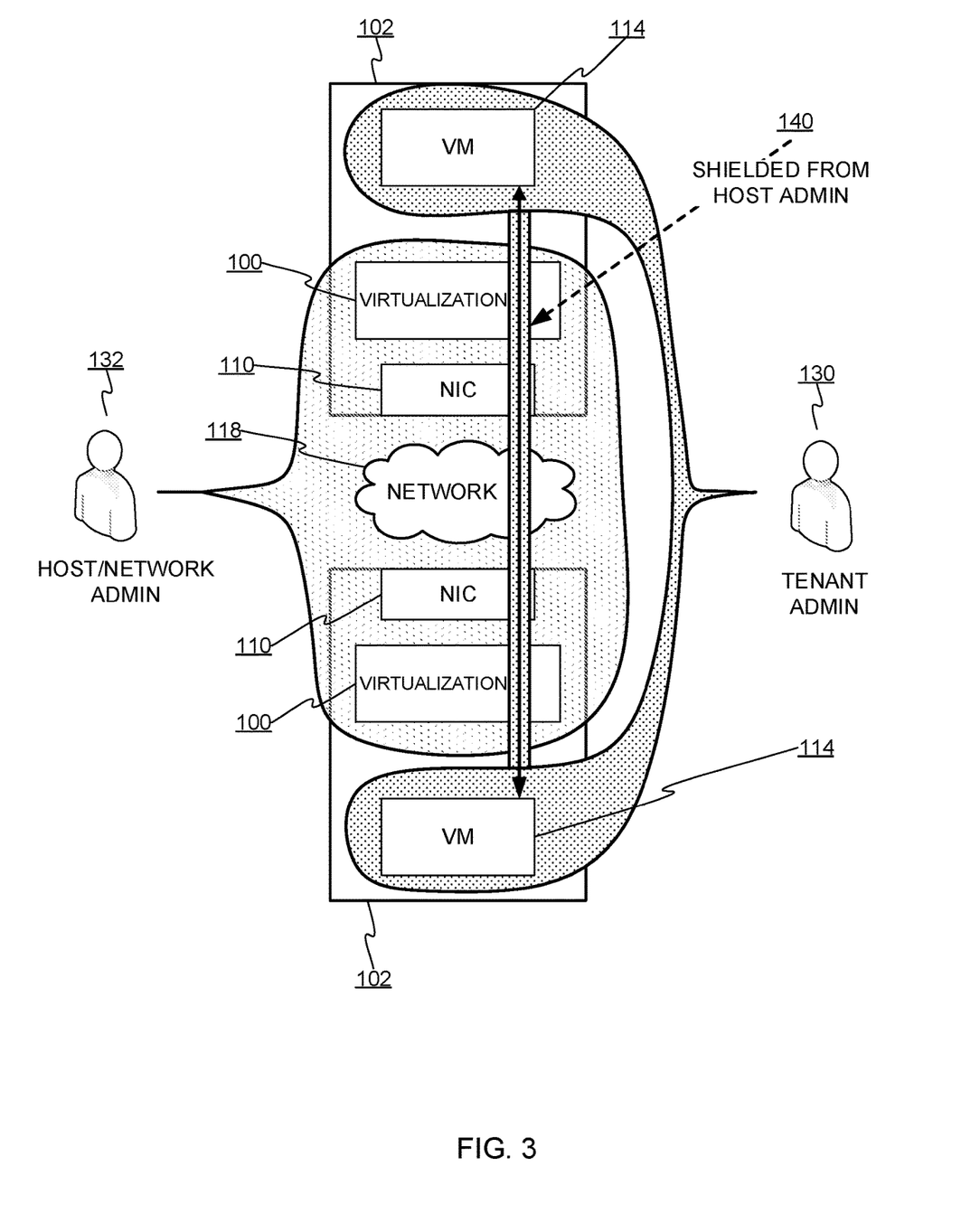
FIG. 3 shows encrypted VM communications that are not exposed to the host administrator.

FIG. 3 shows encrypted VM communications 140 that are not exposed to the host administrator 132. In accordance with embodiments described herein, a VM's network communications are transparently encrypted in ways that reduce or eliminate vulnerability to the host administrator 132. The tenant 130 is assured that a VM's network communications are automatically encrypted without requiring any action by the tenant 130 or the VM's guest software other than initial setup and configuration of the VM. Briefly, an external guardian service secures an encryption key for a VM. The host administrator 132 may lack privilege to access the guardian service and/or its encryption keys and corresponding securement data. Before the VM can communicate via the network, a secure module of the host obtains the VM's key from the guardian service. The key is secured and used in the virtualization layer 100 (e.g., in the vSwitch 120) or elsewhere to encrypt the VM's communications. For convenience, the key will be referred to as the VM's key. However, the key might be a network key, a tenant key, a session key, or the like. That is, where "VM's key" is mentioned herein with respect to network shielding, the key might be owned/managed by other types of entities. Moreover, the attestation service might manage other keys for different purposes. For instance, VM's may have individual attestation-secured keys for VM-specific purposes such as virtual disk encryption, virtual networks may have their own keys, etc. What is notable is that two VMs that are to exchange network communications obtain access to the same key using the same attestation process. Access to the key may be controlled by an access control list or the like. Other types of keys may also be in play; for example, keys from a TPM may serve as device or VM identifiers.

Figure 4:
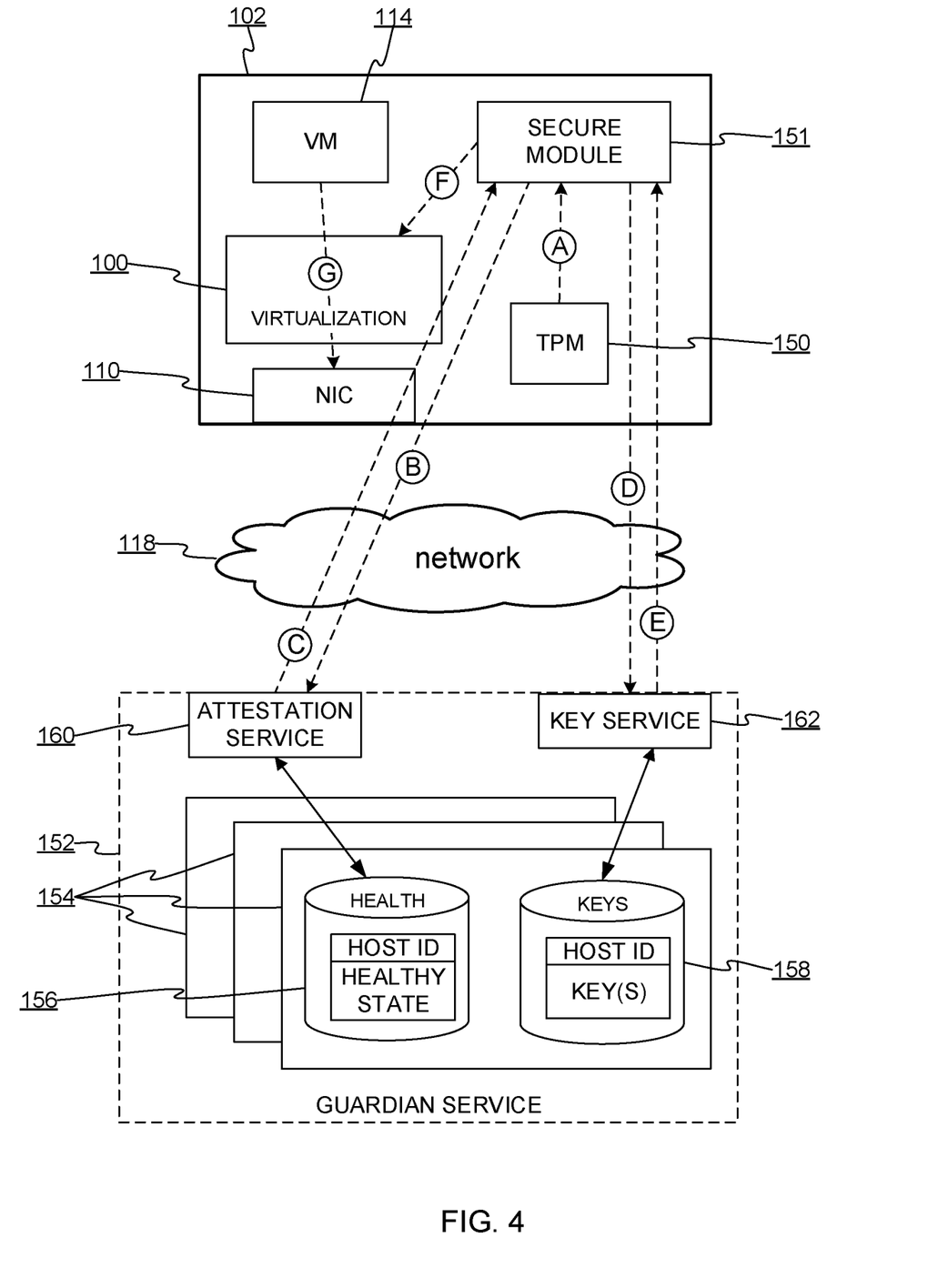
FIG. 4 shows an embodiment for shielding VM network communications.

FIG. 4 shows an embodiment for shielding VM network communications. The host 102 is configured with a hardware-based secure root such as a Trusted Platform Module (TPM) 150. The host is also configured with a secure module 151 that is secured based on the TPM 150. The host 102 is able to communicate via the network 118 with a guardian service 152. The guardian service 152 may be implemented as a cluster of computer servers 154. The server computers 154 (guardian computers) each have a copy of a health data store 156 and a key data store 158 that they securely mirror amongst themselves.

Each server computer 154 provides two services, namely, an attestation service 160 and a key service 162. The services may be implemented as RESTful application programming interfaces (APIs), for example. The guardian service 152 is administered by an entity other than the host administrator 132. That is, the credentials of the host administrator 132 preferably do not authorize administrative privileges on the server computers 154. Preferably, as described below, any administrator of a host or VM is permitted to securely register host or VM health data of respectively owned/administered hosts or VMs into the health data store 156 and associate respective keys in the key data store 158.

Figure 5:
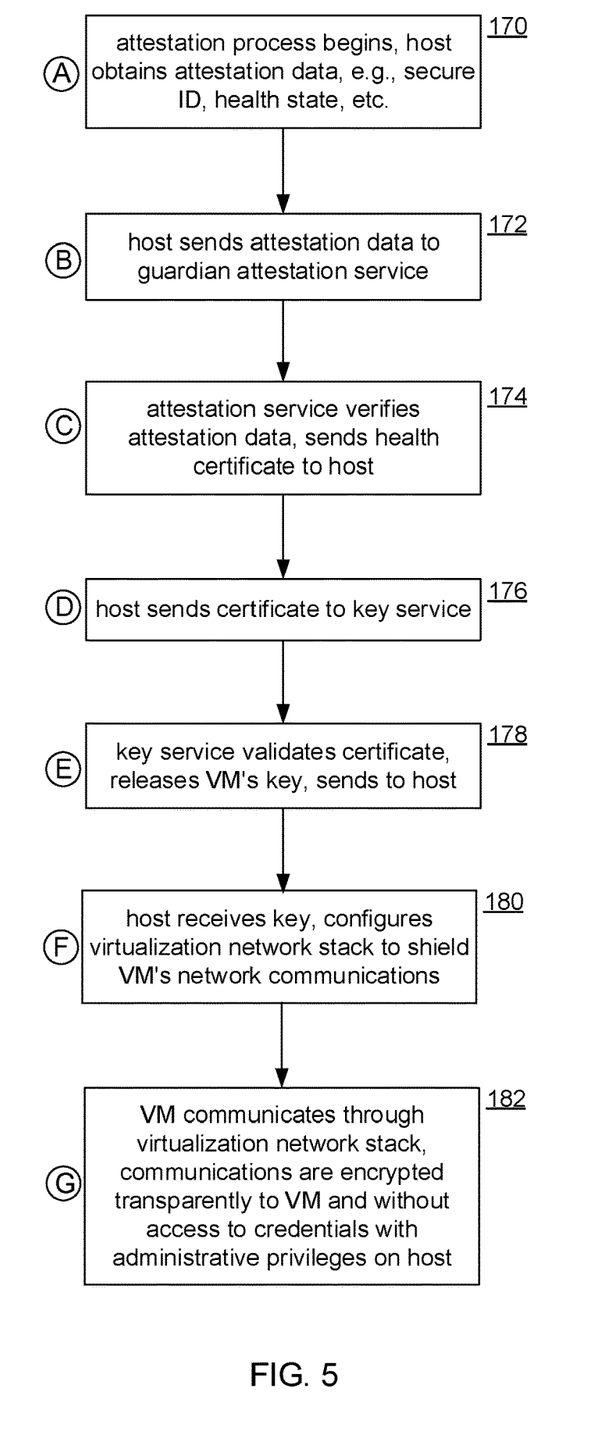
FIG. 5 shows a process performed by the system of FIG. 4.

FIG. 5 shows a process performed by the system of FIG. 4. The letters in FIGS. 4 and 5 correspond to the same steps in the respective figures. Before a VM 114 communicates with another VM via the network 118, the host configures itself for secure communication. The configuration may be driven by a security policy associated with the VM indicating that secure communication is required. Alternatively, a security policy may be associated with the relevant network (or virtual network), tenant, VM group, or any object that can be associated with a VM. In any case, based on an indication that the VM requires shielded network communication, the host computer 102 configures itself accordingly.

To secure the VM's communications, a chain of trust is built from a root of trust to the host 102 and the necessary elements thereof. The TPM 150 may serve as the root of trust. TPMs are known types of devices that typically include secure storage, crypto-processors, hardwired identifiers, and the like. Because the VM is executed by the host 102, the host 120 and the relevant components are chained to the root of trust, i.e., the TPM 150. Each link in the chain assures the security/integrity of the next. By assuring that the host and relevant software are secure, the encryption of the VM's communications can also be assured of being secure.

To facilitate secure operations such as collecting attestation data and others, a secure module 151 may be used. The secure module 151 may be a minimal virtualization environment incorporated into the host's boot process. It may have its own virtualization/hypervisor kernel, an interactive shell, and may be secured through the boot chain of trust. In one embodiment, the secure module 151 is implemented as a VIRTUAL SECURE MODE™ module provided by Microsoft Corporation.

Returning to FIGS. 4 and 5, at step 170, attestation of security of the host begins. At boot time, a set of boot measurements are captured to a security log file in the TPM. The boot measurements may be information such as hardware identifiers of hardware involved in booting, hashes of files involved in booting (e.g., firmware, the operating system boot loader, master boot records), the order in which hardware/software elements are involved in the boot, and so forth. Details of secure booting are described in detail elsewhere. For instance, see the Unified Extensible Firmware Interface (UEFI) secure boot specification. The host collects the attestation data such as boot measurements, an identifier or public key of the host (from the TPM 150), a code integrity policy (e.g., a whitelist of hashes of approved code), etc.

At step 172 the host sends the collected attestation data to the attestation service 160 of the guardian service 152. At step 174 the attestation service 160 on one of the computer/guardian servers 154 uses the host's identifier in the attestation data (e.g., a public key) to look up pre-stored healthy-state data of the host. The pre-stored healthy-state data is generated during a boot of the host and captured and registered to the guardian service 152 as valid by the host administrator (typically, after a pristine build/install of the host's software). If the attestation service 160 confirms that the received attestation data is consistent with pre-stored healthy-state data then the attestation service 160 generates a health certificate for the host. A hash of the health certificate may be signed by a private key of the guardian service 152, which allows the host to use the service's public key to conform the signature of the health certificate. The health certificate may have information defining its expiration time, its scope of validity (e.g., the particular host for which it was issued), types/levels of privilege authorized by the certificate, etc.

Figure 7:
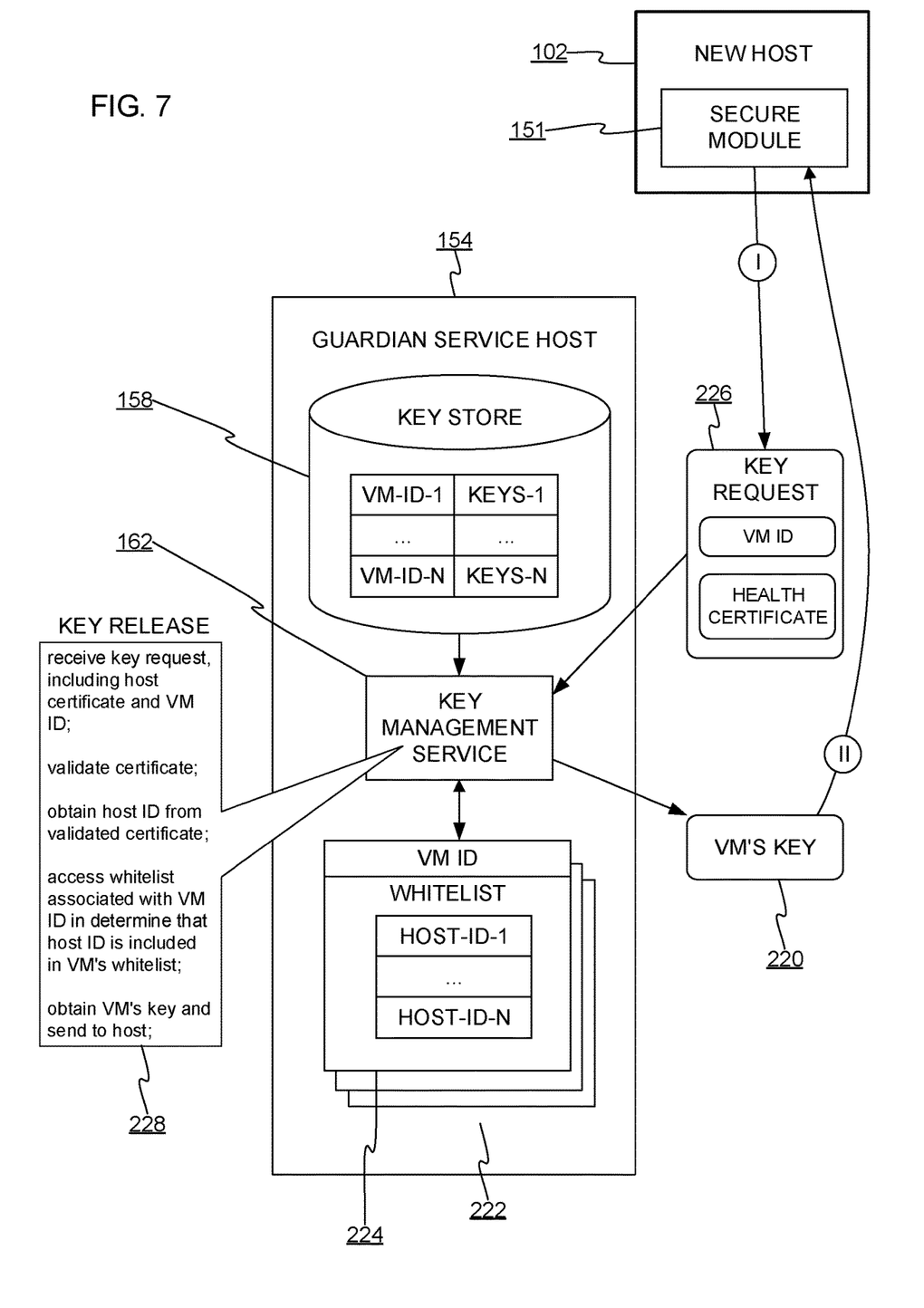
FIG. 7 shows details of a guardian host releasing a VM's key.

At step 176, for a variety of possible reasons, the host determines that it needs the key for the VM. For instance, the host may be attempting to power on the VM and may need the key to do so. The key may also be deemed necessary when the running VM initiates network communications. Need for the key might be determined when evaluating a security policy or setting of the VM. Based on a determination that the VM's key is needed, the host sends its health certificate to the key service 162 of a server computer 154. The key request includes an identifier of the VM. In one embodiment, the VM includes a synthetic or virtual TPM (vTPM) which is secured by the hosts' TPM. In this case, the VM's identifier is extracted from the vTPM. The host sends the health certificate and the VM's identifier to the key service 162.

At step 178 the key service 162 receives the health certificate and the VM identifier. The key service 162 validates the health certificate, which contains an identifier of the host. Based on the validation and the identifier of the host, the key service 162 determines whether the host is authorized to receive the VM's key. As discussed below with reference to FIG. 7, the key service 162 may maintain authorization whitelists for each registered VM. A whitelist may consist of identifiers of hosts, networks, groups, credentials, or other objects authorized to receive a corresponding VM's key. The key service 162 determines that the received host identifier is authorized for the received VM identifier. Consequently, the key service 162 uses a key from the decrypted health certificate to encrypt the VM's key. The encrypted VM key is then sent to the host.

At step 180 the host receives the encrypted VM key. The secure module 151 uses the key in the health certificate to decrypt the VM's key. The VM key is now in the clear and available for performing a variety of security operations on the VM. One such operation is encrypting the VM's network communications. At step 182 the host begins automatically encrypting the VM's network traffic using the VM's key. The secure module 151 may have sufficient privilege to alter the network communication stack of the host's virtualization layer 100. As described in detail below, any part of the path in the virtualization layer through which VM communications flow can potentially be modified or augmented to encrypt all communications of the relevant VM in a way that is transparent to the VM.

The encryption of the VM's communications is transparent to the VM. Within the VM, the guest software need not do anything different or have any concern for the encryption. When the VM transmits a packet, the packet passes from the VM's vNIC to the host's virtualization layer (the vNIC can also be considered part of the virtualization layer). The virtualization layer may encrypt the VM's traffic in several ways. One approach is to encrypt the payload of each frame or packet emitted by the VM. Another approach is to use a tunneling technique where the host forms a connection with the destination host, encrypts the packets/frames (including headers) from the VM, and encapsulates them in packets of the host-to-host connection. The destination host either decrypts the payloads or, if encapsulation is used, decapsulates the packets, decrypts the decapsulated packets, and passes the decrypted packets to the destination VM.

Regarding the remote endpoint that the shielded VM is communicating with, the endpoint may be any device capable of going through essentially the same steps that the VM goes through; acquiring a health certificate from the guardian service, using the certificate to request the VM's key, validating the certificate, determining that the remote node is authorized to access the VM's key (e.g., the remote node is on the VM's whitelist), releasing the key to the remote node, and encryption/decryption using the VM's key. The remote node or endpoint may be another VM or a physical host. Any endpoint having the VM's key, no matter how acquired, should be technically capable of fully encrypted communication with the VM.

Because the encryption is transparent to the VM as well as the remote endpoint (e.g., another VM), some embodiments may involve the host giving notice to the remote node when encrypted communication is possible, imminent, or starting. A handshake protocol may be used, where the host sends a message containing the identifier of the VM. The remote node responds by going through the health attestation/certification and key acquisition processes described above. When the remote node receives a packet from the shielded VM, the corresponding data pathway on the remote node includes a module to decrypt the packets received from the VM's host.

Notification of the remote node can be triggered in several ways with tradeoffs between responsiveness and overhead. In one embodiment, the VM's host anticipates possible encrypted communication with the remote node based on historic activity of the VM, powering on the VM, activity of the VM's vNIC, etc. It is possible that forthcoming encrypted communication is anticipated but the address of the remote node may not be known. The host may use a layer-2 or layer-3 broadcast mechanism to advertise the VM's identity and its potential to begin sending encrypted packets. This may give other hosts a chance to pre-configure themselves for encrypted communication with the VM. In another embodiment, the host may inform the guardian service (using its health certificate) and the guardian service, knowing the whitelist of devices authorized to communicate with the VM, sends a notice to each such whitelisted device (or group, or network, etc.). In yet another embodiment, the host detects a new network connection request from the VM and notifies the device for which the connection is requested.

Figure 6:
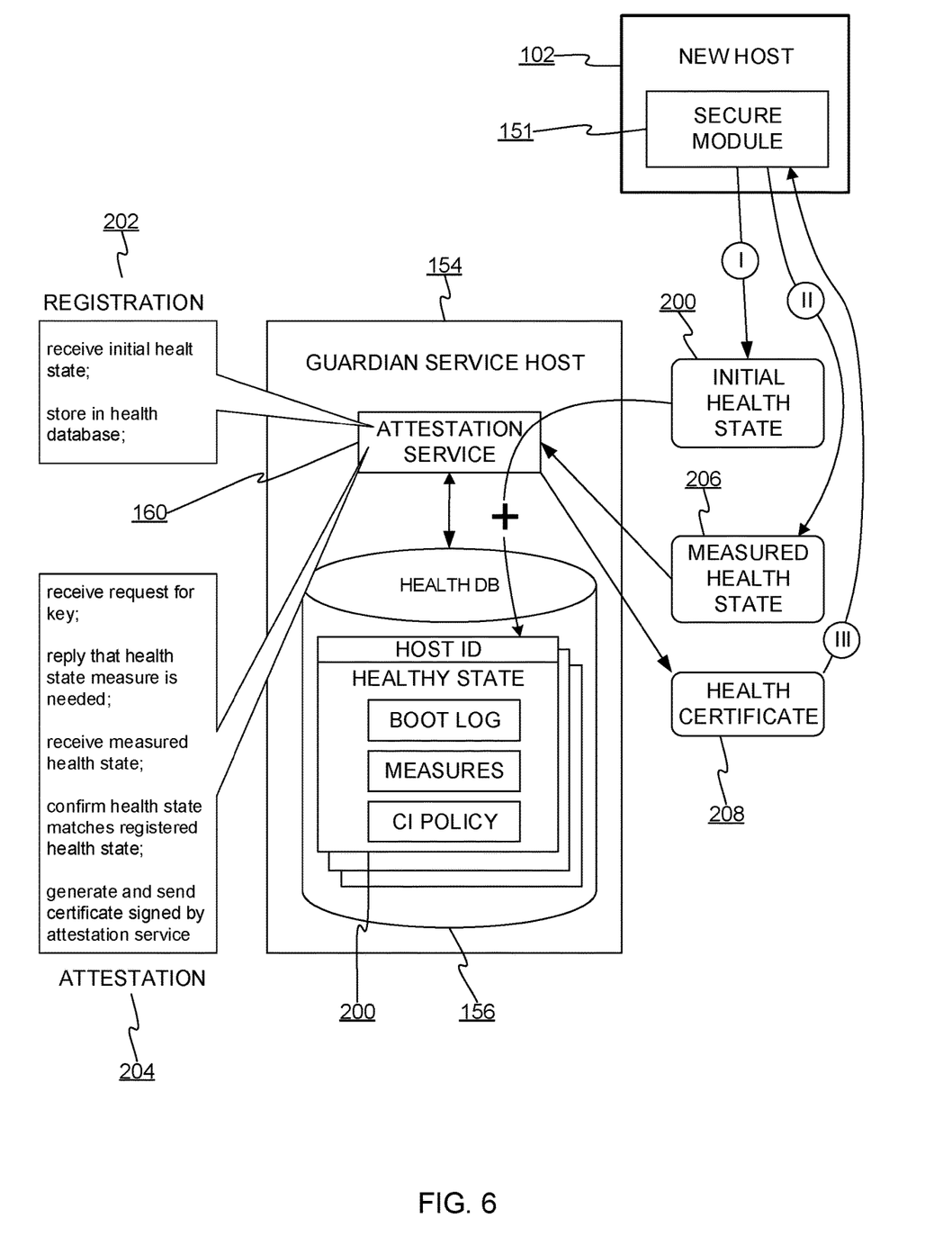
FIG. 6 shows attestation details of a guardian server.

FIG. 6 shows attestation details of a guardian server 154. As noted above, the attestation service 160 maintains a health data store 156. The health data store 156 may be a table or dataset of health-state records 158 for respective hosts, indexed by host identifiers. The attestation service 160 includes a registration process 190 for establishing health-state records 158. Attestation registration is preceded by a trusted administrator building a trusted host that is to be registered. First, a trusted software base is installed. Then, a code integrity policy may be added by invoking a "snapshot" command when the subject device is in a desirable clean state. At this point a code integrity policy is enforced and there is a well-built (trustworthy) image.

To introduce the new host to the guardian service, the secure module 151 is used to generate initial health state 200. The secure module 151, as discussed above, may use hypervisor technology (e.g., a secure hypervisor-type kernel) for security but not necessarily for managing VMs. Given the secure module 151 and the new host built with a known secure state, initial health state 200 is generated. First, an identifier for the host is obtained, for instance a public key from the new host's TPM (which may also be used to whitelist the host). Then, boot measurements, which have been recorded in a TPM log, are extracted. A code integrity (CI) policy is also captured from the TPM log; the CI policy indicates what a good boot path looks like. The new host then submits (step I) the initial health state 200 to a registration process 202 of the attestation service 160. The registration process 202 receives the initial health state 202 and stores it in the health data store 156.

The guardian host's attestation service 160 also implements an attestation process 204. When the new host is in production and requires a VM's key for various VM shielding purposes, the host might initially request the VM's key. If a valid health certificate is not presented, the attestation process 204 may respond with a request for a health state measurement. At step II the host replies by sending its most recent measured health state 206, which also is extracted from its TPM log. The attestation process 204 receives the measured health state 206, confirms that the measured health state 206 sufficiently matches the initial health state 200 stored in the health data store 156, generates a health certificate 208, and sends it to the host (step III). At this point, the host is able to verify, with its health certificate 208, that it is in a state secure enough to prevent a host administrator from accessing shielded VMs on the host.

FIG. 7 shows details of a guardian host 154 releasing a VM's key 220. The guardian host 154 includes an authorization store 222 which stores an authorization record 224 for each VM, indexed by VM identifiers. Each authorization record 224 comprises an access control list or other information that specifies which hosts (or other VMs) are authorized to access the respective VM's key material stored in the key data store 158. The guardian service may track which tenant credentials are authorized to modify which of the authorization records 224.

When the new host is to access a VM's key, the host sends a key request 226 that identifies the VM and that includes the host's health certificate. A key release process 228 receives the key request 226, validates the health certificate, obtains the host's ID from the validated health certificate, accesses the authorization record 224 of the VM identified by the key request 226, and if the authorization record 224 indicates that the host is authorized to access the VM's key 220, the key release process 228 releases the VM's key 220 to the host. The host's secure module 151 can then use the VM key 220 for decrypting the VM's virtual disk, encrypting the VM's network communications, etc.

Figure 8:
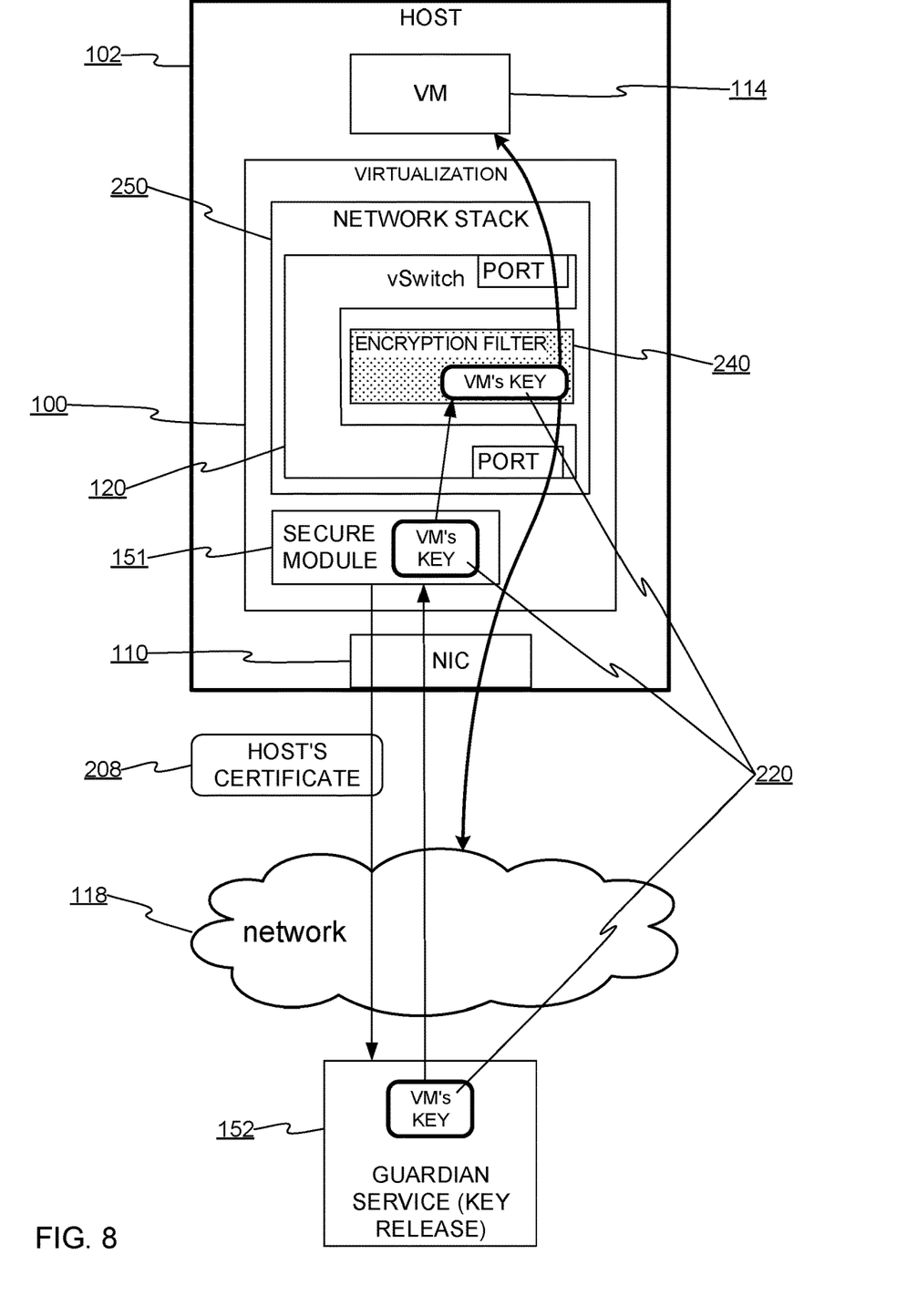
FIG. 8 shows an embodiment where a virtual switch (vSwitch) encrypts a shielded VM's network communications.

FIG. 8 shows an embodiment where the vSwitch 120 encrypts a shielded VM's network communications. As discussed above, the host 102 obtains a health certificate 208, which it uses to obtain a copy of the VM's key 220. The virtualization layer includes a network stack 250 for handling VM and host networking. The vSwitch 120 is configured with software interfaces to enable modules or filters to be plugged into the vSwitch 120; network communications traversing the vSwitch 120 flow through the filters. In one embodiment, when the VM key 220 is successfully obtained, the secure module 151 obtains an encryption filter 240 from a secure source such as a secure network controller. A security policy associated with shielding VM communications may require that the encryption filter 240 be the only filter currently active in the vSwitch 120 or have a certain order relative to other filters (note that the virtualization layer may have multiple vSwitches; other VMs may use other vSwitches to avoid the encryption filter).

Each packet flowing from the shielded VM 114 through the vSwitch 120 is encrypted by the VM's key 220, and each packet flowing from the vSwitch 120 to the VM is decrypted by the VM's key 220. As mentioned above, the encryption filter 240 can either encrypt payloads, in which case headers are cleartext and potentially exposed to the host administrator. It is also possible to use encapsulation encryption where whole packets from the VM are encrypted and then encapsulated in packets that are addressed to a destination host hosting a destination VM. The destination host, presumably in possession of the VM's key 220, either decrypts packet payloads and forwards them to the VM, or, if encapsulation is used, decapsulates the payloads (which are encrypted whole packets), decrypts the decapsulated payloads to reproduce the packets originally transmitted by the sending shielded VM 114, and passes the decrypted packets to the destination VM.

In one embodiment, the encryption filter 240 is executed by the secure module 151. In another embodiment, the encrypt filter 240 accesses the key from secure storage of the secure module 151 or from a synthetic/virtual TPM of the relevant VM.

Figure 9:
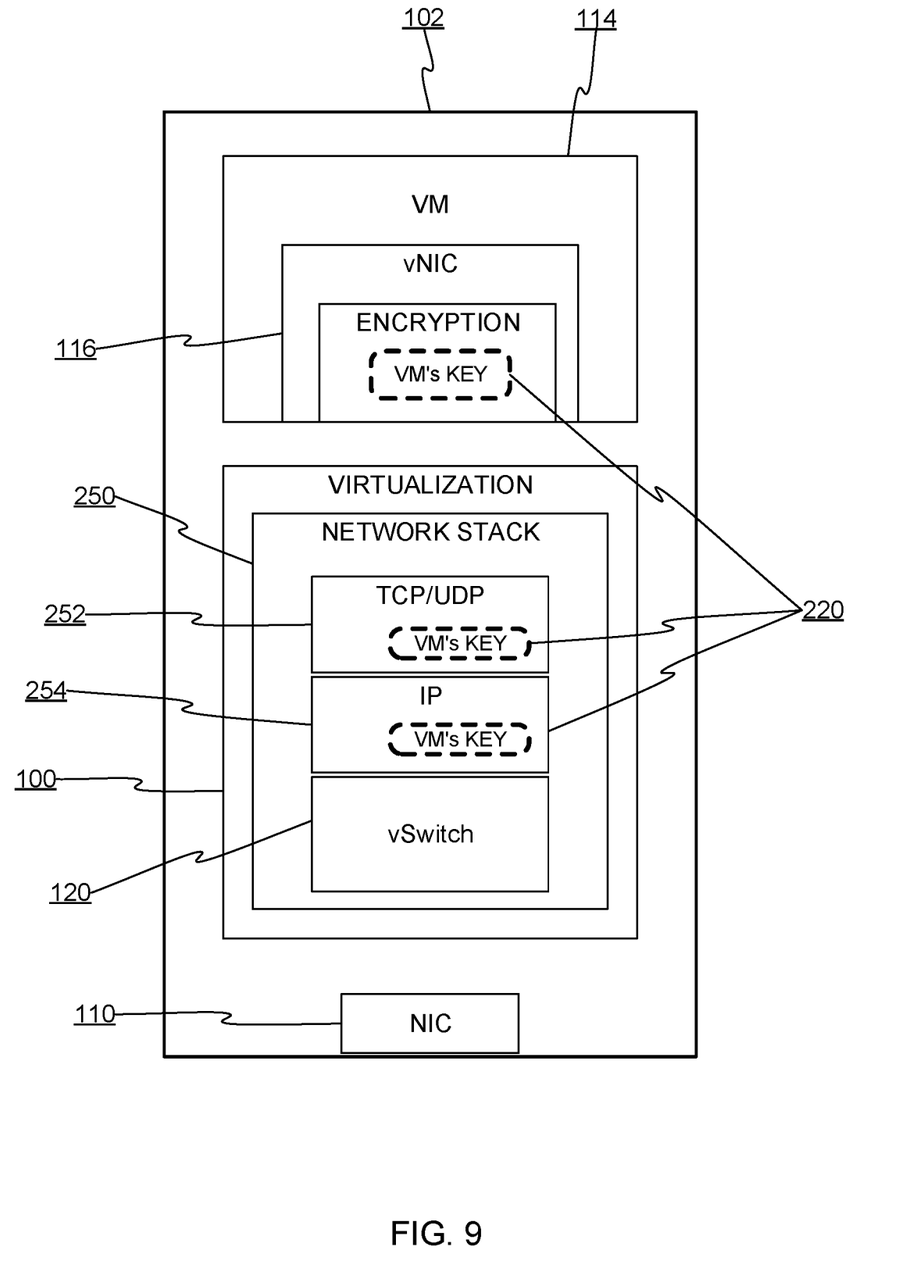
FIG. 9 shows different points in the virtualization layer where VM traffic may be transparently encrypted.

The encryption for shielding a secure VM's communications may take place anywhere between the physical NIC 110 and the VM 114. The closer to the VM 114, the less host software the unencrypted VM communications will pass through. FIG. 9 shows different points in the virtualization layer 100 where VM traffic may be transparently encrypted. The network stack 250 of the host or virtualization layer 100 typically includes modules for implementing protocols at respective network layers. Encryption can be added at any such layer, for instance at the transport layer 252 or the Internet Protocol (IP) layer 254. The encryption may also take place in the vNIC 116 of the VM 114. The vNIC 116, a shim, or a device driver may be programmed to implement the encryption algorithm.

In one embodiment, the encryption filter 240 implements a symmetric encryption algorithm. In another embodiment, the VM key 220 is a private key and the corresponding public key is readily obtainable based on the VM's identifier. In this way, an unsecure entity can send encrypted data to the VM using the public key and the receiving host can use the VM's private key to decrypt the incoming network communications. In addition, the encryption of the embodiments described will not interfere with guest-based encryption such as IPSec encryption.

It should be noted that the release/acquisition of the VM key 220 and the intention of the corresponding VM to initiate network communication need not be linked. If the secure module has already obtained the VM's key and the VM's key is available, for instance from recently powering on the VM, then when network encryption is needed the previous release of the VM key can be relied on.

The security functions of the guardian service may be distributed among other clusters or guardian hosts. That is, one network service might handle attestation, another might handle key storage and release, and another might maintain the authorization data/whitelists that control which hosts have access to the keys of which VMs. The term "guardian service" as used herein refers to any such combination, where functions such as health attestation and key storage/release are performed by devices other than a host computer requiring attestation and key release.

In some cases, two VMs execute on the same host computer and the two VMs are required by security policy to communicate by encryption that is transparent to the VMs. The embodiments described above may be used, even if the inter-VM communications do not pass out of the host computer and over a physical network. For instance, if the virtualization layer provides an inter-VM communication channel such as a virtual bus, network communications between the VMs that are actually conveyed by the virtual bus may also be encrypted using either of the VM's guarded key.

Because encryption is transparent to the VMs, it can be useful to provide information that a VM guest can use to detect that its communication is being encrypted. For example, a page of shared memory, directly accessible by the hypervisor and guest operating system, may be used to store information indicating that the VM is marked or configured for encryption. This may allow guest software to reduce overhead by deactivating or avoiding guest-based encryption of network communications.

It should further be noted that securing a VM's communications against access by privileged code executing on the VM's host computer may be aided by assuring that the VM's key is stored on a different device (e.g., a guardian host) where the host administrator's credentials lack authorization to access the VM's key. Put another way, the VM's key is under administrative control of the tenant rather than a host/provider administrator. Various aspects of the VM (e.g., virtual disk, network communication) may be assured to be encrypted on the host computer and may be decryptable only if the host computer is determined to be healthy by another device or service for which the host administrator is also not authorized.

Figure 10:
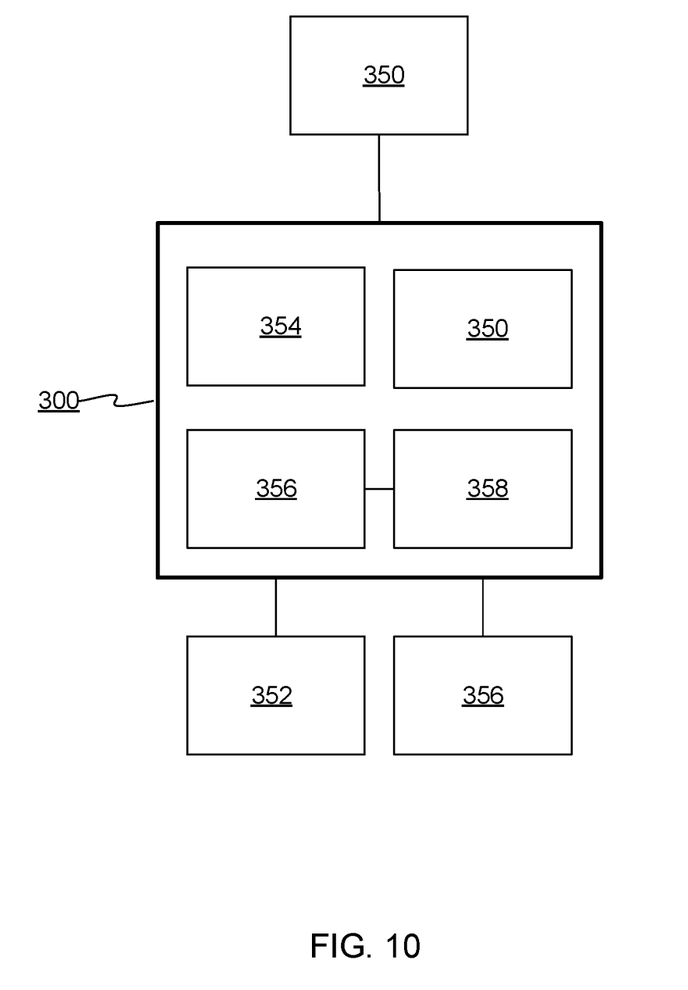
FIG. 10 shows a computing device.

FIG. 10 shows details of a computing device 300 on which embodiments described above may be implemented. The virtualization hosts 102, guardian hosts 154, or other computing devices mentioned herein may be implemented as a computing device 300. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 300 to implement any of the features or embodiments described herein.

The computing device 300 may have one or more displays 350, a network interface 354 (or several), as well as storage hardware 356 and processing hardware 358, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 356 may be any combination of magnetic storage, static memory, volatile memory, non-volatile memory, optically or magnetically readable matter, etc. The meaning of the terms "storage" and "storage hardware", as used herein does not refer to signals or energy per se, but rather refers to physical apparatuses and states of matter. The hardware elements of the computing device 100 may cooperate in ways well understood in the art of machine computing. In addition, input devices may be integrated with or in communication with the computing device 300. The computing device 100 may have any form-factor or may be used in any type of encompassing device. The computing device 300 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 358. The stored information can be in the form of machine executable instructions (e.g., compiled executable binary code), source code, byte-code, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method, performed by a host computing device comprised of storage hardware and processing hardware, and a network interface card (NIC), the method comprising:
   executing a virtualization layer that manages the execution of virtual machines (VMs) on the host computing device;
   securely capturing health data of the host computing device, the health data corresponding to boot and/or code state of the host computing device;
   sending the health data via a network to a guardian service implemented by one or more guardian hosts;
   receiving a health certificate via the network from the guardian service, the health certificate corresponding to a determination by the guardian service that the health data is consistent with securely stored prior health data of the host computing device;
   transmitting the health certificate and an identifier of the VM via the network and in response receiving a VM key of a VM on the host computing device, wherein the VM key is uniquely associated with the VM, and wherein the VM key is sent to the host computing device based on the transmitted health certificate and the identifier of the VM; and
   configuring the virtualization layer to use the VM key to (i) encrypt outbound network communications from the VM, and (ii) decrypt inbound network communications before they are delivered to the VM, wherein the outbound network communications remain encrypted by the VM key when they are transmitted by the NIC of the host.

2. A method according to claim 1, wherein the virtualization layer comprises a network stack that comprises a virtual switch, a virtual NIC, and a network protocol stack, and wherein the encrypting is performed by the virtual switch, the virtual NIC, the NIC, or the network protocol stack.

3. A method according to claim 1, wherein the health data indicates an order of components that participated in booting the host computing device and/or software elements whitelisted for execution on the host computing device, and wherein the health data is directly or indirectly secured by a Trusted Platform Module (TPM) of the host computing device.

4. A method according to claim 1, wherein the VM key is received from the guardian service, and wherein the guardian service releases the VM key to the host computing device based at least in part on a determination by the guardian service that an identifier of the host computing device transmitted from the host computing device to the guardian service corresponds to an identifier authorized to access the VM.

5. A method according to claim 4, further comprising enabling encrypted network communication between the VM and a second VM on a second host computing device by:
   the host computing device sending identifier of the VM to the second host computing device; and
   based on the VM identifier, the second host computing device obtaining the VM key of the VM from the guardian service.

6. A method according to claim 5, wherein the VM key is released to the second host computing device by the guardian service based on success of a health attestation process between the second host computing device and the guardian service, the health attestation process confirming that a health state of the second host computing device corresponds to a health state of the second host computing device that was previously registered with the guardian service.

7. A method according to claim 1, wherein the virtualization layer comprises a type I or type II hypervisor and a secure module secured by a TPM of the host computing device, wherein the host computing device stores the VM in an encrypted state when not executing the VM, and wherein the host computing device is configured to use the VM key to decrypt the virtual machine only if the health certificate is validated by the guardian service.

8. A method according to claim 1, further comprising sending the health certificate to the guardian service and receiving the VM key from the guardian service based on the guardian service validating the health certificate.

9. A host computer comprising:
   a network interface card (NIC)
   processing hardware;
   storage hardware storing instructions configured to cause the processing hardware to perform a process, the process comprising:
      executing a virtualization layer comprising a hypervisor kernel that manages use of the processing hardware by virtual machines (VMs) configured to execute on the host computer, the virtualization layer comprising a network stack that directs network communications received by the NIC of the host computer to the VMs and that directs network communications originating from the VMs to the NIC to be transmitted to the network;
      executing a secure module, the secure module configured to communicate via the network with a guardian service to obtain, via the network, a key of the VM based on an attestation of a health state of the host computer and based on an identifier of the VM, wherein the identifier uniquely identifies the VM, and wherein the guardian service provides the key based further on the identifier; and
      configuring the host computer to use the VM key to (i) encrypt outbound network communications transmitted from the VM and (ii) decrypt inbound network communications before they are delivered to the VM, wherein the outbound network communications remain encrypted by the VM key when they are transmitted by the NIC of the host computer, wherein the configuring, the encrypting, and the obtaining the VM key are not performed by the VM.

10. A host computer according to claim 9, wherein the network stack comprises a virtual NIC of the VM, a virtual switch, and a protocol module that implements a communication protocol, and wherein the encrypting is performed by the virtual NIC, the virtual switch, or the protocol module.

11. A host computer according to claim 9, wherein the VM key is secured by a chain of trust linked to a TPM of the host computer.

12. A host computer according to claim 9, wherein the secure module comprises a kernel secured by a code integrity policy.

13. A host computer according to claim 9, wherein the VM is configured to communicate with another VM over the network, and wherein a second host computer obtains the VM key from the guardian service and uses the VM key to encrypt/decrypt communications that are exchanged with the other VM.

14. A host computer according to claim 9, wherein the process further comprises collecting health data indicating elements of the host computer involved in booting the host computer, sending the health data to the guardian service, and receiving from the guardian service a health certificate corresponding to the attestation of the health state of the host computer.

15. A host computer according to claim 14, wherein the VM key is obtained by sending the health certificate over the network.

16. Computer storage hardware storing information configured to cause a computer to perform a process, the process comprising:
- executing a virtualization layer that manages virtual machines (VMs) executing on the computer;
- capturing an attestation of a security state of the host computer and sending the attestation via a network to a guardian service, the host computer comprising a network interface card (NIC) that sends the attestation to the network;
- obtaining, via the NIC and the network, a key corresponding to one of the VMs, the key obtained based on the attestation and based on the computer sending an identifier of the VM via the network, the identifier of the VM uniquely identifying the VM; and
- using the key to (i) encrypt outbound network communications of the VM after they are emitted by the VM, and (ii) decrypt inbound network communications before they are delivered to the VM, wherein the outbound network communications remain encrypted by the VM key when they are transmitted by the NIC of the host".

17. Computer storage hardware according to claim 16, wherein the encrypting/decrypting is performed by a virtual switch of the virtualization layer.

18. Computer storage hardware according to claim 17, wherein the virtual switch is configured to execute plug-in modules that are plugged in to the virtual switch to cause them to process packets passing through the virtual switch, and wherein the encrypting/decrypting is performed by a plug-in module.

19. Computer storage hardware according to claim 16, wherein the VM comprises a virtual TPM that is secured by a physical TPM of the computer, and wherein the identifier of the VM is obtained from the virtual TPM.

20. Computer storage hardware according to claim 16, wherein the encrypting is performed by a vSwitch, vNIC, or physical NIC, and wherein the attestation of the security state is based on verification of a code integrity policy and/or confirming that a boot log matches a securely stored boot log.

* * * * *